United States Patent
Bayly

(10) Patent No.: US 7,186,083 B2
(45) Date of Patent: Mar. 6, 2007

(54) WIND ENERGY CONVERSION DEVICE

(76) Inventor: Elliott Bayly, 1302 W. 5th St., Duluth, MN (US) 55806

( * ) Notice: Subject to any disclaimer, the term of this patent is extended or adjusted under 35 U.S.C. 154(b) by 241 days.

(21) Appl. No.: 10/165,080

(22) Filed: Jun. 6, 2002

(65) Prior Publication Data

US 2003/0227174 A1    Dec. 11, 2003

(51) Int. Cl.
*F03D 7/04* (2006.01)
(52) U.S. Cl. .............. 416/51; 416/87; 416/89; 416/117; 416/118; 415/4.3; 415/4.5; 290/1 B; 290/55
(58) Field of Classification Search ............ 416/23, 416/44, 47–48, 51–52, 87–89, 117, 118, 132 B, 416/136, 169 R; 415/4.3, 4.5, 908; 290/1 B, 290/44, 55, 45
See application file for complete search history.

(56) References Cited

U.S. PATENT DOCUMENTS

| | | | |
|---|---|---|---|
| 2,037,528 A | | 4/1936 | Miller |
| 2,058,500 A | | 10/1936 | Plucker |
| 2,074,149 A | | 3/1937 | Jacobs |
| 2,126,202 A | | 8/1938 | McColly |
| 4,316,698 A | | 2/1982 | Bertoia |
| 4,355,955 A | * | 10/1982 | Kisovec ................ 416/23 |
| 4,374,631 A | | 2/1983 | Barnes |
| 4,418,287 A | | 11/1983 | Syverson |
| 4,495,423 A | * | 1/1985 | Rogers ................ 416/89 |
| 4,715,782 A | * | 12/1987 | Shimmel ............ 416/169 R |
| 4,867,642 A | * | 9/1989 | Vinther ............... 416/89 |
| 4,877,374 A | * | 10/1989 | Burkett ............... 416/136 |
| 4,952,119 A | * | 8/1990 | Widseth ............... 416/3 |
| 5,456,579 A | * | 10/1995 | Olson ................ 416/23 |
| 5,746,576 A | * | 5/1998 | Bayly ................ 416/16 |

FOREIGN PATENT DOCUMENTS

GB    2156006    10/1985

OTHER PUBLICATIONS

International Search Report dated Apr. 5, 2004; International Application No. PCT/US03/17908, filed Jun. 6, 2003, entitled Wind Energy Conversion Device.

* cited by examiner

*Primary Examiner*—Christopher Verdier
(74) *Attorney, Agent, or Firm*—Birdwell & Janke, LLP

(57) ABSTRACT

A wind energy conversion device includes a propeller in which each of the propeller blades includes a proximal (radially inward) non-airfoil mounting section, a medial section and a distal tip section mounted to pivot relative to the medial section about a pitch axis running lengthwise of the blade. At low wind speeds, each tip section and its associated medial section cooperate to provide a single airfoil. When the propeller rpm exceeds a predetermined threshold, each of the tip sections begins to pivot toward a full governing position, which tends to reduce the propeller rpm. To permit wind tracking, the device is mounted to pivot on a vertical axis. The propeller blades are downwind of the vertical axis, and slightly inclined to define a cone diverging in the downwind direction. The electrical power generating components are located upwind of the propeller and centered about the propeller axis, and have a radius less than the length of the proximal blade sections. Forming the airfoil component of the blade in several sections (medial section, tip section and further sections as desired) facilitates fabrication by injection molding.

15 Claims, 7 Drawing Sheets

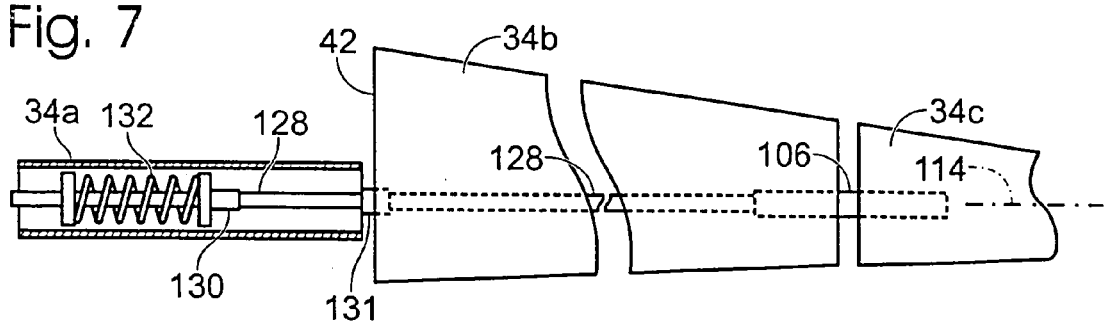
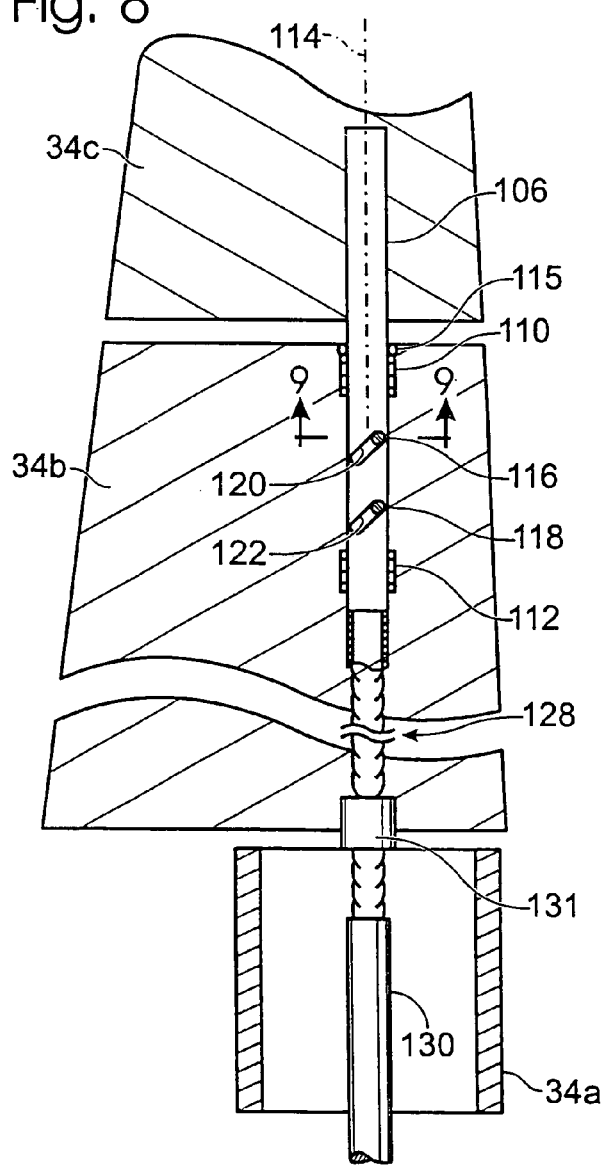
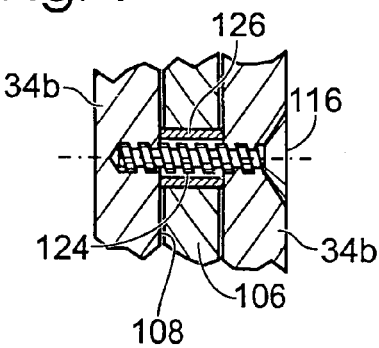

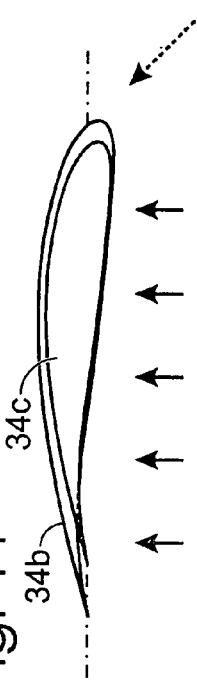
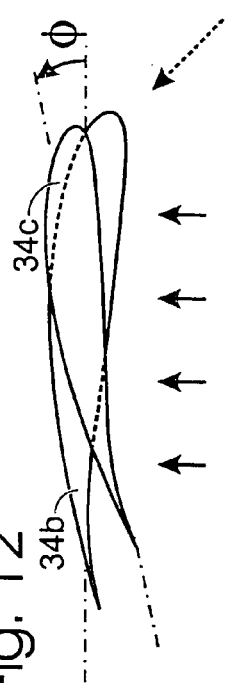
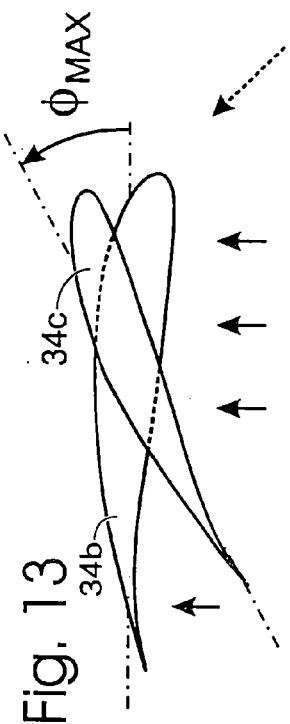
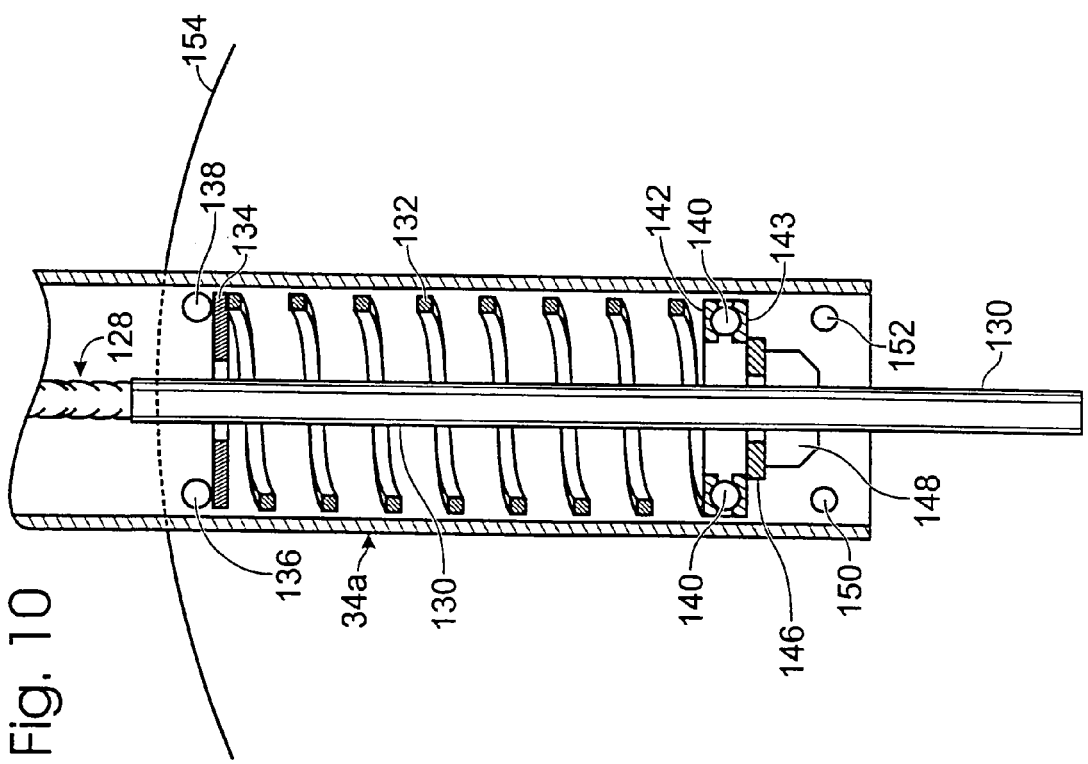

WIND ENERGY CONVERSION DEVICE

BACKGROUND OF THE INVENTION

The present invention is directed to systems and devices for converting wind energy into electrical power, and more particularly to governing mechanisms to provide overspeed protection and power regulation for such systems and devices, and also to features for improving the efficiency and wind tracking and power regulation capability of these systems and devices.

Wind energy conversion systems continue to gain favor as lower cost and more environmentally sound alternatives to more centralized methods of generating electricity. Devices and systems for converting wind energy frequently are used to supplement the electric power available over power transmission lines, and may be the sole source of electric power in remote areas where electrical power transmission is impractical or impossible. In addition to generating electrical power, wind conversion devices also are used to provide direct mechanical power via gear trains and other mechanisms driveably coupled to a wind-driven rotor or shaft.

All of these devices are subject to variations in wind velocity. Usually it is advantageous to design a system with a propeller capable of delivering useful amounts of electrical power at relatively low wind velocities. However, given that the force due to wind increases in proportion to the cube of the wind speed, high wind speeds even if only occasional or momentary can damage system components.

Accordingly, wind energy conversion devices advantageously incorporate governing mechanisms to prevent propeller assemblies from rotating at unduly high speeds in response to high winds. These include whole blade pitching mechanisms, airfoil spoilers or flaps, blade tip breaks and ailerons. Other governing mechanisms act upon the entire propeller rather than the individual propeller blades, to tilt the propeller plane out of the direct wind path. U.S. Pat. No. 5,746,576 (Bayly) discloses a particularly effective governing mechanism of this type, in which a propeller structure is supported to rotate on a vertical yaw axis, and also to pivot on a governing axis inclined about 30 degrees from the vertical, such that the propeller structure is biased by gravity into a normal operating position in which the propeller plane is perpendicular to the wind. Wind of a sufficient speed overcomes gravity, to incline the propeller plane relative to the wind direction by an angle that varies in proportion to the wind velocity, for the desired governing action.

In larger capacity wind energy conversion devices, there is greater need to limit forces acting upon the components supporting the propeller. This increases the need for governing mechanisms operable upon individual propeller blades, avoiding the need to tilt the entire propeller structure including the blades and propeller shaft. Larger propellers also give rise to concerns with blade fabrication. Traditional fiberglass propeller blades require considerable labor in finishing and smoothing the blades. Cost reductions are possible if the blades are formed by injection molding. However, standard injection molding machinery is not well suited for fabricating larger propeller blades. Potential cost savings are diminished or lost, due to the need to provide special configurations or equipment for molding larger blades. Further, larger propeller blades formed by injection molding are subject to irregularities from uneven cooling along the blade length due to different thicknesses and contours.

Conventional systems raise several more concerns not specifically tied to propeller blade size, such as the need for increased efficiency, quieter operation, lower manufacturing cost, and more predictable blade behavior over a range of wind velocities triggering governing action.

SUMMARY OF THE INVENTION

To address the foregoing concerns, there is provided a propeller structure for wind energy conversion, including a propeller shaft supportable for rotation about a propeller axis. Several propeller blades are arranged symmetrically about the propeller axis and extend away from the propeller shaft along respective blade axes. Each of the propeller blades includes a first blade section fixed with respect to the propeller shaft and a second blade section disposed radially outwardly of the first blade section, and mounted for movement with respect to the first blade section between a normal operating position in which the blade transfers a maximum level of wind power to the propeller shaft, and a full governing position in which the blade transfers a reduced level of wind power to the propeller shaft. A biasing structure is adapted to urge the second blade sections toward their respective operating positions, with a biasing force selected to determine a rotational velocity threshold at which rotation of the propeller blades causes the second blade sections to move toward their respective full governing positions in opposition to the biasing force.

The biasing structure can include a spring or other component adapted to increase the biasing force as the radially outward second blade (tip) sections move toward their full governing positions. Accordingly, the tip sections are adapted to assume intermediate governing positions between the normal operating position and the full governing position. Governing can occur over a range of propeller rotational velocities above the threshold, with the forces due to propeller rotation and the biasing structure tending to balance one another at a given intermediate location, so long as the wind velocity remains constant. Each tip section preferably pivots about an axis parallel to the blade axis, whereby the blade pitch increases progressively with the rotational velocity above the threshold. To this end, each of the blade tip sections is advantageously coupled to its associated first blade section through a guide/guide follower arrangement that causes the angle of pitch to increase as the blade tip section moves radially outward relative to the first blade section.

Several advantages arise from this arrangement, one of which is the ability to fabricate large propeller blades by injection molding. In one specific example, the eight-foot airfoil of a blade with a full length of ten feet is formed in two airfoil sections each with a length of four feet, or alternatively with a shorter tip section, for example from two to three feet in length. In either event, the use of shorter airfoil sections facilitates the use of injection molding by minimizing the problems due to uneven cooling noted above, resulting in easier, less costly fabrication of the propeller blades. Not only is the cost of blade fabrication reduced, but the resulting airfoils are more uniform, and the range of usable materials is enlarged by the ability to employ injection molding.

Another advantage is a more direct and stable mounting of the propeller. With the governing mechanism built into the propeller blades, the propeller shaft can be mounted to rotate on a horizontal axis for normal operation and governed operation. There is no need for added components to tilt the propeller shaft out of its horizontal orientation.

With each tip section mounted to pitch about an axis substantially parallel to the blade axis, the pitch axis can be selectively positioned so that wind pressure assists tip section pitching, acts against tip section pitching, or is neutral at least initially, i.e. applying about the same force on both sides of the pitch axis. Further, the guide/guide follower coupling of the tip section allows arrangements in which the biasing structure, designed to keep each blade in the normal operating position at low wind speeds, acts lengthwise along the blade.

According to another aspect of the present invention, there is provided a wind energy conversion apparatus. The apparatus includes a propeller mounting structure pivotable on a substantially vertical yaw axis. A propeller shaft is mounted for rotation relative to the propeller mounting structure on a substantially horizontal rotor axis. A plurality of propeller blades are mounted with respect to the propeller shaft spaced apart from the yaw axis, extended away from the propeller shaft, and inclined substantially uniformly relative to the rotor axis to define a cone centered on the rotor axis and diverging in a direction away from the yaw axis. Each propeller blade is shaped to provide an airfoil.

Each of the propeller blades preferably comprises a blade component providing the airfoil, and a mounting component disposed between the propeller shaft and the blade component. The mounting component can have a non-airfoil configuration whereby substantially all of the wind power transferred to the propeller shaft is due to the blade component.

The downwind location of the propeller blades, together with the incline of the blades to provide the desired cone, enhances the capacity of the apparatus to track the wind, and rapidly adjust to changes in wind direction. Construction is simplified, in that no tail or other steering vane is required. Use of the mounting components reduces the cost of the propeller blades, and results in quieter operation of the apparatus at all wind speeds, particularly when the mounting components extend radially beyond the rotor and stator of an electrical energy generator concentric on the propeller shaft.

Another aspect of the present invention is a wind power generator including a rotor shaft support structure and a rotor shaft mounted for rotation relative to the rotor support structure about a substantially horizontal rotor axis. Several propeller blades are mounted with respect to the rotor shaft and extend away from the rotor shaft for transferring wind power to the rotor shaft. A stator assembly, fixed with respect to the support structure, includes an annular stator rim, a stator winding supported on the stator rim, and a plurality of stator frame members extending radially between the support structure and the stator rim to position the stator rim concentrically about the rotor axis. The stator frame members are spaced apart to provide open regions allowing passage of air between the stator rim and support structure. The generator further includes a rotor assembly, fixed with respect to the rotor shaft for rotation therewith. The rotor assembly includes an annular outer rim, a permanent magnet array supported on the outer rim, and a plurality of rotor frame members extending radially between the rotor shaft and the outer rim to position the outer rim concentrically about the rotor axis, and further to position the permanent magnet array in close, confronting, radially-spaced-apart relation to the stator winding. The rotor frame members are spaced apart to provide open regions allowing passage of air between the outer rim and the rotor shaft. Each of the stator rim and outer rim has a radius larger than its axial length and larger than a diameter of the rotor shaft.

The open construction of the generator components allows free passage of air around and about these components during operation. The generator runs at a lower temperature than would be the case in conventional closed structures. The result is enhanced efficiency, enabling the use of a smaller generator to yield a given power requirement, along with longer generator life.

Preferably the generator further includes a shield with an outer annular wall surrounding the magnet array and stator winding, and an inner annular wall surrounded by the permanent magnet array and stator winding. The shield has an intermediate wall extended between the inner wall and the outer wall on an upwind side of the permanent magnet array and the stator winding. A plurality of shield frame members, extended radially between the rotor shaft support structure and the inner annular wall, cooperate to provide an open framework to fix the shield with respect to the rotor shaft support structure. The shield protects the rotor and stator components while substantially preserving the cooling effect provided by the open-frame construction of the rotor and stator components.

Preferably the propeller blades are disposed downwind of the yaw axis. The rotor assembly and stator assembly are disposed between the yaw axis and the propeller blades, i.e. downwind of the yaw axis and upwind of the blades. This arrangement positions the rotor and stator assemblies for more exposure to the wind, for the increased cooling effect.

According to yet another aspect of this invention, there is provided a propeller blade construction including an elongate propeller blade having a lengthwise blade axis. The propeller blade is adapted to be coupled to a propeller shaft for rotation about a propeller axis with the blade extending substantially radially away from the propeller axis. The propeller blade includes a first airfoil section adapted to be fixed with respect to a propeller shaft, and a second airfoil section disposed pivotably relative to the first airfoil section about a pitch axis substantially parallel to the blade axis, between a normal operating position in which the propeller blade is adapted to transfer a maximum level of wind power to the propeller shaft, and a full governing position adapted for transferring a reduced level of wind induced torque to the propeller shaft. The second airfoil section is coupled to the first airfoil section through a coupling structure including a guide integral with the first airfoil section and a guide follower integral with the second airfoil section. One of the guide and guide follower defines a substantially helical surface engaged with the other of the guide and guide follower, whereby the second airfoil section when pivoting also moves linearly relative to the first airfoil section in the direction of the pitch axis. A biasing component is provided to urge the second airfoil section toward the normal operating position, with a biasing force selected to determine a rotational velocity threshold at which rotation of the propeller blade causes the second airfoil section to move toward the full governing position in opposition to the biasing force.

The coupling arrangement is particularly effective in determining a consistent, predictable relationship between the forces acting on the second airfoil section due to propeller rotation, and the angle of blade pitch. The biasing component preferably acts linearly, parallel to the blade axis, providing a centripetal force to maintain the second airfoil section in the normal operating position so long as propeller rotation is below the rotational velocity threshold. At any given rotational speed above the threshold, the centrifugal force effect momentarily exceeds the centripetal force, causing the second airfoil section to move radially away from the first airfoil section until the centripetal force balances the centrifugal force effect. The distance between the airfoil sections increases with the rotational velocity according to a consistent, repeating function. Due to the guide/guide follower coupling, the pitch angle is likewise consistently related to the propeller rotational velocity. Consequently the governing action, which depends on the pitch angle of the second airfoil section, is predictable over a range of governing locations between the normal operating and full governing positions.

The pitch axis can be located in a neutral position with blade rotation alone counteracting centripetal force at least initially; offset for wind resisted governing whereby rotation overcomes centripetal force and wind pressure against the blades; or offset such that propeller rotation and wind pressure act against the centripetal force.

The wind resisted offset arrangement is particularly useful in the event that the normal electrical load is lost due to an accident, an electrical system malfunction, or interruption of a utility connection. The propeller rotational velocity in this event is higher than normal for all wind speeds. Conversely, at any given rotational speed the wind pressure is less, as compared to pressure under normal load conditions. As a result, the blade tip airfoil sections begin to pitch at a lower rpm. The earlier blade pitching beneficially reduces noise and provides improved overspeed protection under load loss conditions. This feature also is useful in battery charging systems, because it enables reduction of the electrical output of a wind generator in a charging system when the battery becomes fully charged, without unduly increasing aerodynamic noise.

Thus in accordance with the present invention, high capacity wind energy conversion systems feature propeller blades with radially inward airfoil sections fixed relative to the propeller shaft, and radially outward airfoil sections coupled to the inward sections for movement between normal operating positions and governing positions. This affords a more stable mounting of the propeller shaft, by providing the desired governing action without the need to tilt the propeller shaft. Blades with separate radially inward and radially outward airfoil sections are amenable to forming by injection molding at significantly reduced cost. Further, when the blades are disposed downwind of the yaw axis, incorporate radially inward non-airfoil mounting sections, and are inclined to define a cone diverging downwind, wind tracking capability is enhanced and noise is reduced.

IN THE DRAWINGS

For a further understanding of the above features and other advantages, reference is made to the following detailed description and to the drawings, in which:

FIG. 3 is a side elevation of the device;

FIG. 7 is a schematic view showing governing and tip section biasing components of one of the propeller blades;

FIGS. 8–10 are enlarged views showing of the governing and biasing components;

FIGS. 11–13 are schematic views illustrating operation of the governing mechanism;

DETAILED DESCRIPTION OF THE PREFERRED EMBODIMENTS

Figure 1:
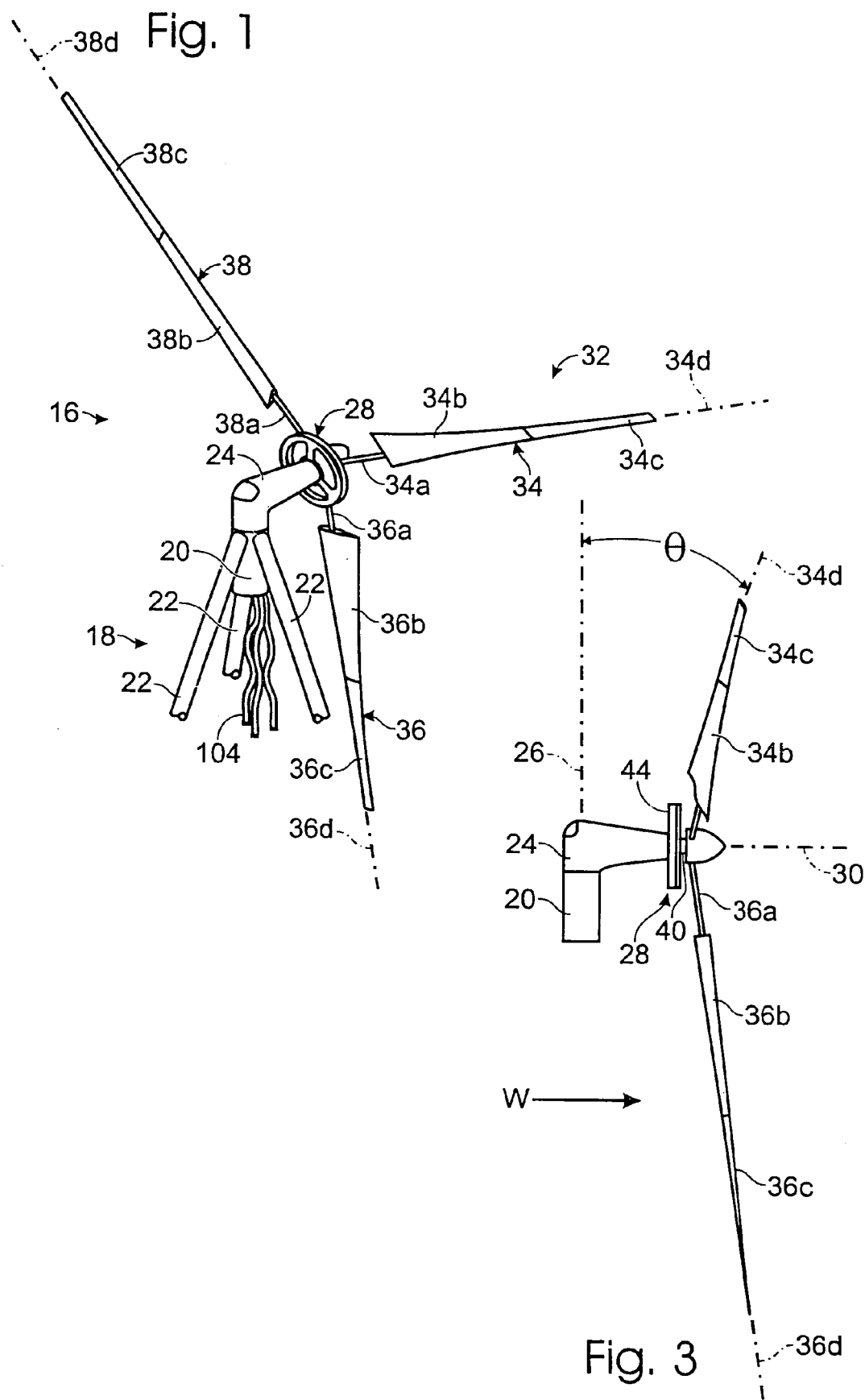
FIG. 1 is a perspective view of a wind energy conversion device constructed according to the present invention.

Turning now to the drawings, there is shown in FIG. 1 a wind energy conversion device 16 constructed according to the present invention. The device is supported on a tower 18 in the form of an open frame that provides stationary support for the power generating components. The tower includes a vertical sleeve 20 and legs 22 extending upwardly from the ground or foundation (not shown) to the sleeve. Horizontal or inclined cross bracing members (not shown) are coupled between the legs to stabilize tower 18. The height of tower 18 depends on the size of the propeller, and on factors such as topography and proximity of trees and other obstructions to the wind. In one preferred version of device 16, involving a propeller diameter of 20 feet, the tower height can range from about 40 feet to about 140 feet.

Figure 2:
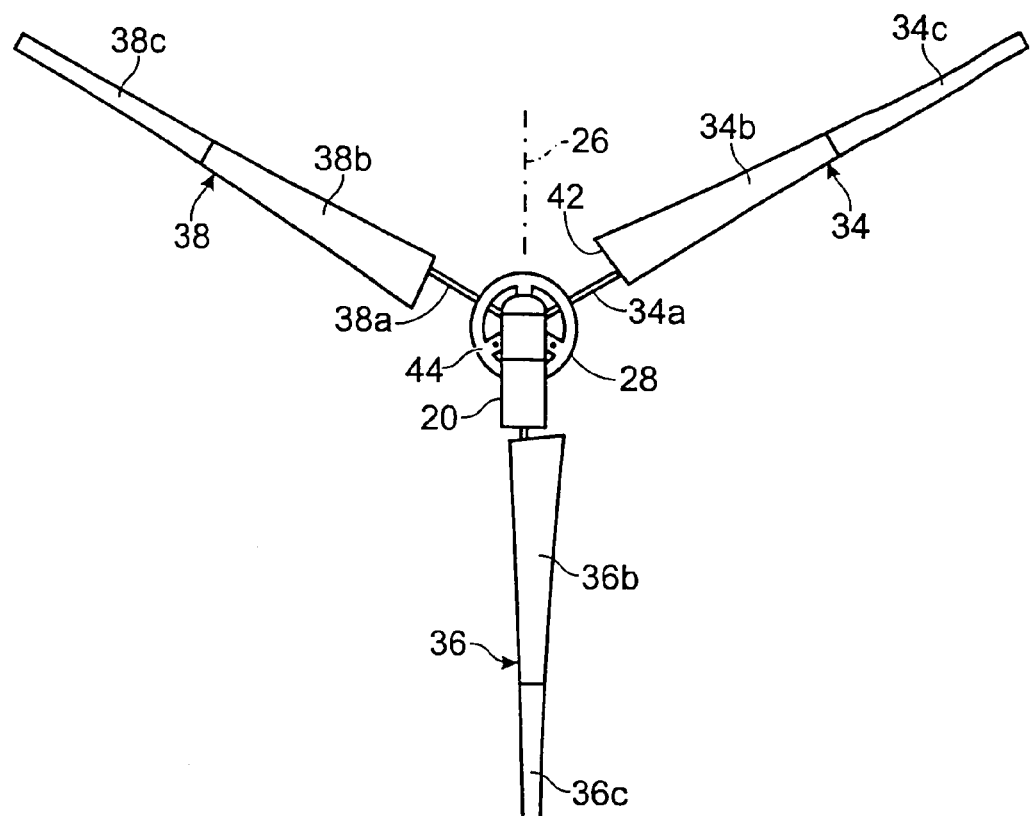
FIG. 2 is a front elevation of the device.

A propeller mounting structure including a shroud 24 is mounted at the top of the tower, to pivot about a substantially vertical yaw axis 26 (FIG. 2). The propeller mounting structure includes a downwardly depending column mounted rotatably within vertical sleeve 20 through a pair of ball bearings to allow the mounting structure to pivot to follow changes in the wind direction.

An electrical power generator 28 includes several components fixed relative to shroud 24, and several components rotatable relative to the shroud about a substantially horizontal rotor axis 30 (FIG. 3). A propeller 32, also mounted to rotate about the rotor axis, includes three propeller blades 34, 36, and 38, symmetrically arranged about rotor axis 30 as best seen in FIG. 2.

Each of the blades has a length of about ten feet and consists of three sections. With reference to blade 34, these include a radially inward or proximal mounting section 34a fixed to rotate with a rotor shaft 40; a medial section 34b shaped to provide an airfoil; and a distal tip section 34c, also shaped to provide an airfoil. Propeller blades 36 and 38 have corresponding mounting, medial and tip sections 36a–c and 38a–c.

Each of the mounting sections is about two feet long, tubular, rectangular, and preferably formed of stainless steel or another material with suitable strength and corrosion resistance. Each of the mounting sections has a non-airfoil configuration and is quite thin compared to its adjacent intermediate blade section, for example having a width (or diameter in circular profile versions) of about 1½ to 2 inches, as compared to a blade width of at least six inches at an inside edge 42 of the intermediate blade section. The mounting sections can be embedded into their adjacent intermediate sections as shown, or secured by bolts or other fasteners.

As shown in FIGS. 1–3, the intermediate blade sections and the tip sections are each about four feet long, thus to provide a full blade length of ten feet including the mounting section. The shorter airfoil sections can be injection molded using common press sizes, and a wider choice of materials is available when the airfoil sections are injection molded. Finally, injection molding results in more uniform airfoils for quieter, smoother, and more balanced propeller operation. In other versions of the propeller, the intermediate sections have lengths of five to six feet, with the corresponding tip sections having lengths of three to two feet. Providing two four-foot airfoils is favored from the standpoint of minimizing the irregularities that might occur from uneven cooling in the injection molding process. However, the shorter blade tip sections have a significant operational advantage, due to their reduced weight. During propeller rotation, the tendency of the tip sections to travel along a tangential rather than circumferential path creates a centrifugal force effect. The components securing each tip section to the remainder of the blade must provide a centripetal force sufficient to counteract the centrifugal force effect, to ensure that each tip section travels arcuately with the rest of the propeller blade. The necessary centripetal force increases with the weight of the tip section, and also with increasing propeller rotational speed.

The structure biasing each blade tip into the normal operating position is incorporated into the tip section coupling in the preferred embodiments, and accordingly must be configured with the centrifugal force effect in mind.

Because the airfoils are tapered to become narrower in the radially outward direction, reducing the blade tip length from four feet to two feet reduces the tip section weight by more than one-half. Similarly, reducing the length from four feet to three feet reduces the weight by more than one-quarter. It has been found that the shorter tip sections provide satisfactory governing, although they require higher maximum pitch angles than the longer tip sections. Thus, propeller blades configured with shorter distal blade tips enable the use of smaller and less costly coupling and biasing components, provide longer and more reliable operation of the device, or both.

In any event, when the tip sections are in the normal operating position as shown in FIGS. 1–3, each medial blade section and its associated tip section cooperate to provide a single, continuous airfoil for transferring a maximum level of wind power to the propeller shaft. As later explained in detail, each of the tip sections is mounted to pivot with respect to its associated medial blade section, between the normal operating position shown in FIGS. 1–3 and a governing position for transferring a reduced level of wind power to the propeller shaft. In either position, substantially all of the wind power transferred to the propeller shaft is due to the blade medial sections and tip sections, given the minimal width and non-airfoil character of the mounting sections. Further, because of their radially inward location, the mounting sections account for only about four percent of the circular area swept by the propeller blades. As a result, the non-airfoil character of the mounting sections does not significantly detract from the wind power conversion capacity of the propeller.

Propeller blades 34, 36 and 38 extend substantially radially away from rotor shaft 40 along respective blade axes 34d–38d. More particularly, the blade axes are inclined from a radial extension by an angle of about seven degrees, to form an angle of about 83 degrees with the rotor axis. Accordingly, the propeller blades cooperate to define a cone that diverges in the downwind direction, and away from yaw axis 26.

More generally, the propeller blades can be inclined anywhere from about two degrees to about ten degrees from the radial orientation. The incline of the blades enhances the degree of clearance with respect to tower 18, reducing the "wind shadow" effect of the tower, for quieter operation. The incline also improves propeller blade wind tracking, i.e. the capability to rotate rapidly about the yaw axis in response to shifts in the wind direction indicated by the arrows in FIG. 3. Another factor in the improved tracking is the substantial distance (at least about 18 inches) between the propeller blades and the yaw axis. This downwind spacing positions the blades downwind of generator 28. For increased cooling, it is advantageous to provide the blade mounting sections with radial extensions that exceed the radius of the generator. In the embodiment illustrated, generator 28 has a radius of about nine inches, compared to the two-foot radial extension of each mounting section. Thus, the airfoil components of the blades are spaced radially outwardly from a pocket of reduced wind speed immediately downwind of generator 28 created by interference from the generator. Because the airfoil components of the blades do not encounter the pocket of reduced wind speed, noise is reduced, especially at higher wind speeds.

Figure 4:
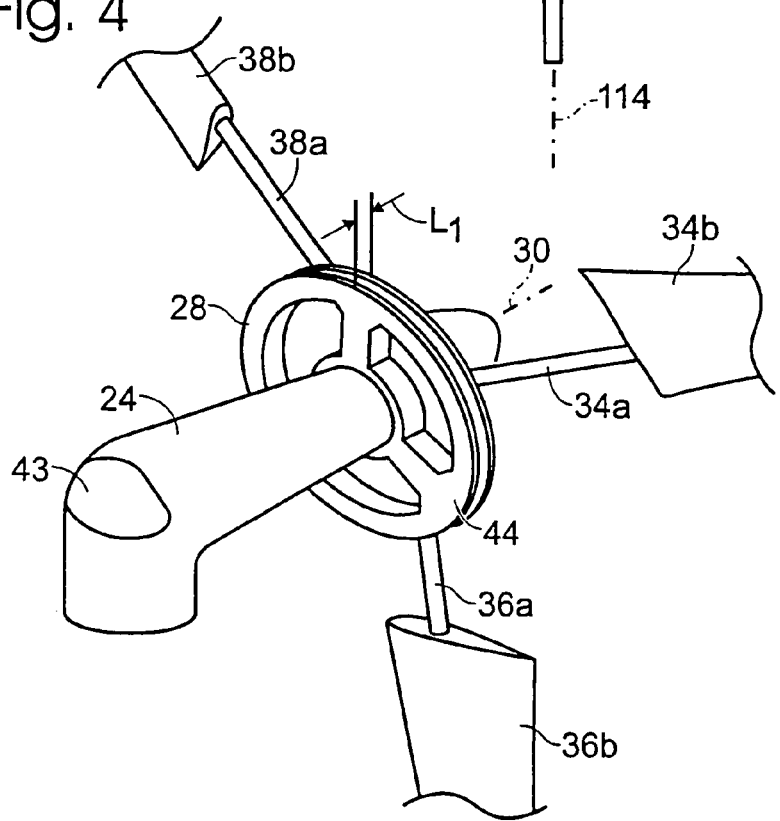
FIG. 4 is an enlarged perspective view of an electrical power generator of the device.
Figure 5:
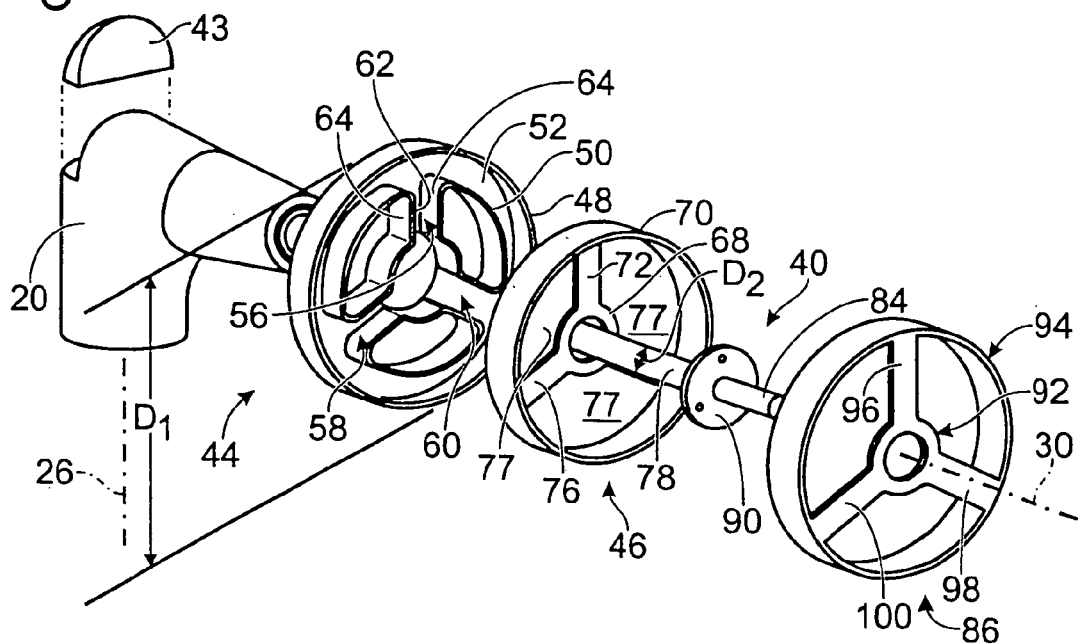
FIG. 5 is an exploded parts view showing components of the generator.
Figure 6:
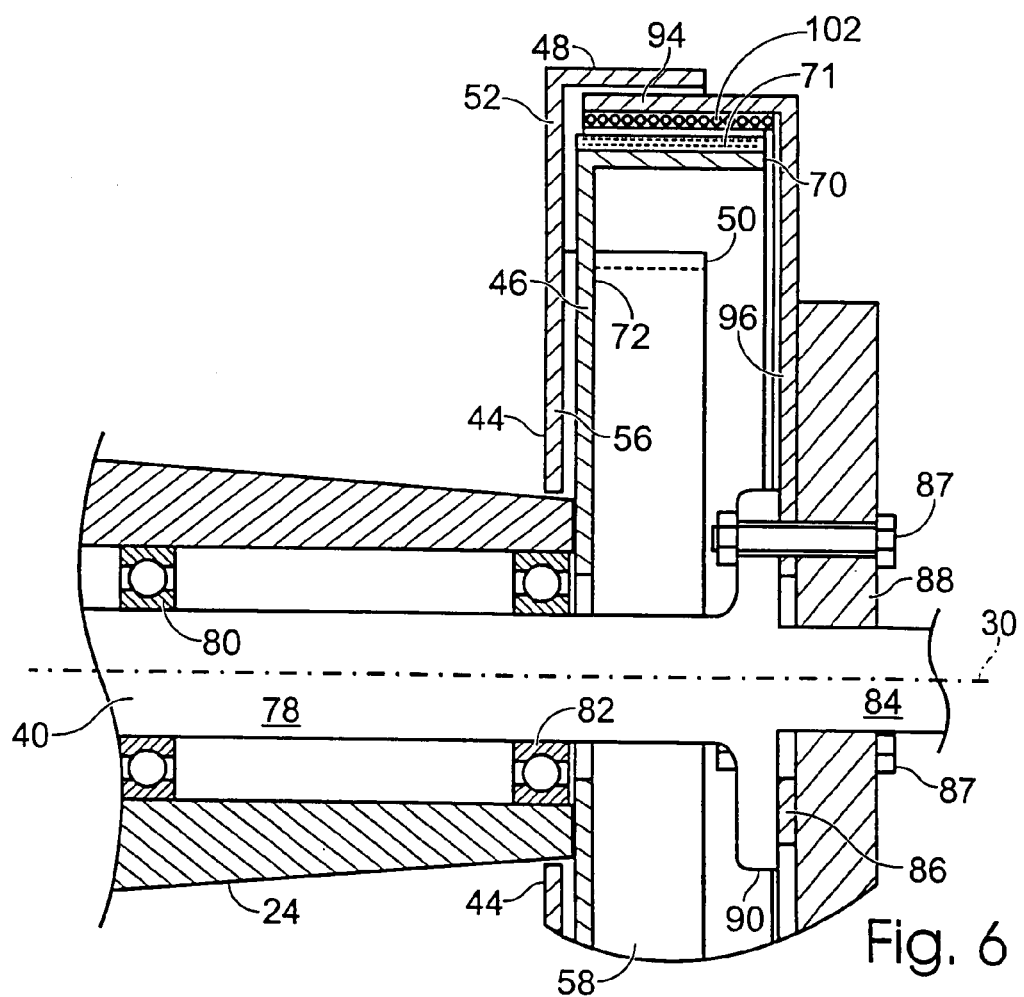
FIG. 6 is a sectional view of the generator.

FIGS. 4–6 illustrate the propeller support structure and generator in greater detail. A transparent or translucent cover 43 allows use of a light inside shroud 24 to indicate generator operation. Generator 28 has a radius of about nine inches, considerably larger than the rotor shaft radius and considerably larger than the axial length of 1.25 inches (in the direction of the rotor axis). The generator includes a shield 44 upwind of a stator 46, both of which are fixed with respect to shroud 24 and concentric on rotor axis 30. Shield 44 includes an annular channel with an outer wall 48, three arcuate inner wall segments 50 parallel with the outer wall, and an intermediate wall 52 extending between the outer and inner walls on the side of shield 44 nearest yaw axis 26, the upwind side. With reference to FIG. 5, shield 44 is open on the downwind side. The shield further includes an annular inner rim 54 secured to the shroud, and three frame members 56, 58 and 60 extended radially between the inner rim and the annular channel. Each of frame members 56–60 has an intermediate wall 62, and opposite side walls 64. Each wall 62 is coplanar with and extends radially outwardly to intermediate wall 52, while each side wall 64 extends radially outwardly to an associated one of inner wall segments 50. Thus, frame members 56–60 form radial channels associated with the annular channel. The frame members are arcuately spaced apart from one other to form open regions 66 that allow passage of air between the annular channel and inner rim 54. Shield 44 can be formed of metal or a polymeric material, e.g. polyurethane.

Stator 46 includes an annular inner rim 68, an annular outer rim 70, and three stator frame members 72, 74 and 76 extended radially between the stator rims. The stator rims and frame members preferably are formed of steel, with outer rim 70 including a stack of stator laminations formed of electrical grade steel. The outer rim is relatively wide in the direction parallel to rotor axis 30, and relatively thin in the radial direction. Stator windings 71, preferably copper wire, occupy slots formed along the outer rim periphery and are wound about portions of the outer rim disposed between the slots. Inner rim 68 and frame members 72–76 are coplanar and relatively thin in the axial direction, with the frame members attached to the outer rim to position the frames and inner rim on the upwind side of outer rim 70. In the assembled generator, frame members 72–76 are disposed within the channels formed by frame members 56–60 of the shield. Stator 46, like shield 44, is fixed relative to shroud 24 and does not rotate about the rotor axis. Frame members 72–76 are arcuately spaced apart from one another to form open regions 77 that allow passage of air between outer rim 70 and inner rim 68.

Further generator components include rotor shaft 40, which has a main body 78 mounted rotatably within shroud 24 through ball bearings 80 and 82. The rotor shaft includes a reduced-diameter pilot extension 84 running axially beyond shroud 24 in the assembled generator as shown in FIG. 6. A rotor frame 86 is secured by fasteners 87 between a propeller bracket or hub 84 and a flange 90 of rotor shaft 40, for rotation with the rotor shaft. The rotor frame includes an annular inner rim 92, an annular outer rim 94, and three rotor frame members 96, 98 and 100 extended radially between rims 92 and 94. The rotor is a unitary member cast of magnetic iron. Thirty neodymium or other rare earth permanent magnets are bonded to the inside surface of outer rim 94 to provide a permanent magnet array 102. As best seen in FIG. 6, magnet array 102 and stator windings 71 are positioned in close, confronting, radially-spaced-apart relation. Propeller rotation moves the permanent magnet array and its magnetic field circumferentially relative to the stator windings, thus inducing an electrical current in the windings. The current is transmitted to electrical lines 104 (FIG. 1) through a brush and slip ring arrangement (not shown) in the shroud, then to a battery typically near the base of tower 18, or to another load.

Outer rim 94 is relatively wide in the direction of rotor axis 30, and relatively thin in the radial direction. Inner rim 92 and frame members 96–100 are coplanar and relatively thin in the axial direction. Frame members 96–100 are attached to the downwind edge of outer rim 94, to position these frame members and inner rim 92 on the downwind side. In the assembled generator, frame members 96–100 place outer rim 94, and particularly annual magnet array 102 in surrounding relation to outer rim 70 and windings 71, while remaining free of shield frame members 56–60 so that rotor 86 is free to rotate with rotor shaft 40.

Propeller 32 incorporates a governing mechanism that provides overspeed protection to minimize the risk of damage to the propeller and other system components in high winds. With reference to FIGS. 7–10, the governing mechanism includes components built into each of propeller blades 34–36. While only propeller blade 34 is illustrated, it is to be understood that the governing components built into blades 36 and 38 are substantially identical to the components described in connection with blade 34.

As shown schematically in FIG. 7, the governing components extend along blade 34 substantially parallel to blade axis 34d. The most radially outward component is a tip section mounting shaft 106, preferably formed of stainless steel, with a length of about six inches and diameter of about ⅜ of an inch. The radially outward portion of shaft 106 is embedded within tip section 34c. That portion of the shaft is bonded within the tip section, and preferably has a knurled or otherwise roughened surface, enhancing the bond to ensure an integral or fixed coupling of the shaft and tip section.

With reference to FIG. 8, the radially inward portion of shaft 106 is mounted within an opening 108 through medial blade section 34b, by a pair of plastic bushings 110 and 112 that allow shaft 106 and tip section 34c to rotate relative to the medial section about a pitch axis 114. The pitch axis and blade axis are parallel, but do not necessarily coincide. If desired, a tubular reinforcing lining can be placed along opening 106. An O-ring 115 forms a moisture seal.

Propeller blade 34 incorporates a guide/guide follower arrangement that cooperates with bushings 110 and 112 to control the motion of blade tip section 34c. The arrangement includes a pair of pins 116 and 118 threadedly engaged in intermediate blade section 34b and extending through respective helical slots 120 and 122 formed in shaft 106. As seen in FIG. 9, pin 116 is threaded into intermediate blade section 34b with spaced apart threaded segments on opposite sides of opening 108 through the intermediate blade section. This locates a shank 124 of the pin within helical slot 120, with the length of the pin perpendicular to the length of the shaft. Along its shank 124, pin 116 is surrounded by a tubular plastic bushing 126 whereby the pin interacts with shaft 106 through its associated bushing. Pin 118 is similarly secured.

In the guide/guide follower arrangement, pins 116 and 118 function as the guide, and the helical surfaces of slots 120 and 122 engage the pins and act as the guide follower. Propeller rotation provides a centrifugal force effect tending to move tip section 34c and shaft 106 away from intermediate blade section 34b in the direction of the pitch axis. As the shaft moves axially, the helical surfaces of slots 120 and 122 ride against their respective pins, causing shaft 106 to pivot on the pitch axis as it moves axially, thus pitching the blade tip section.

As the wind subsides and the propeller rotational speed is reduced, blade tip section 34c moves axially inward toward its original or normal position. Again, the helical slots and pins interact to cause the tip section to pivot back to its original position.

At its radially inward end, shaft 106 is swaged or otherwise permanently fixed to a cable 128, preferably a one-fourth inch diameter stainless steel aircraft cable. The length of cable 128 depends primarily on the length of intermediate blade section 34b. As seen in FIG. 7, cable 128 extends for the length of the intermediate blade section and beyond inside edge 42, to a swaged or otherwise permanent coupling with a stainless steel rod 130 located along blade mounting section 34a. Cable 128 along a region proximate inner edge 42 is surrounded by a cylinder 131 preferably formed of nylon. The cylinder, rather than the exposed cable, rides within an O-ring mounted near inside edge 42. Cylinder 131 preferably is fused to cable 128, causing the nylon or other polymer to fully penetrate the cable. This provides a secure attachment of the cylinder and prevents water from traveling along the cable into the medial blade section by wicking action.

As seen in FIG. 10, rod 130 is surrounded by a coil spring 132. The spring is preloaded, maintained in compression between a plate 134 secured to mounting section 34a by bolts 136 and 138, and a ball bearing 140 with an outer race 142 engaging the spring. An inner race 142 contacts a lock washer 146, maintained by a lock nut 148 threadedly engaged with a threaded end portion of rod 130. Bearing 140 allows the cable and rod to rotate with shaft 106.

Bolts 150 and 152, in cooperation with bolts 136 and 138, secure mounting section 34c to a hub plate 154 mounted to rotate with rotor shaft 40. In this embodiment, hub plate 154 has a diameter of 12 inches, to encompass about one-fourth of the mounting section effective diameter. In this version of the device, further bolts (not shown) secure intermediate blade section 34b to the radially outward end portion of mounting section 34a. This fixes blade sections 34a and 34b integrally with respect to the rotor shaft and hub plate. Accordingly, blade tip section 34c is the only part of the blade that pitches. It has been found that pitching about radial pitch axes, even when confined to radially outward blade tip sections, provides effective overspeed protection, although a blade tip section as compared to a complete blade airfoil is pivoted over a greater arc to achieve full governing.

Coil spring 132, and its counterparts in blades 36 and 38, control governing action in two respects. First, each of the springs is preloaded to provide a predetermined centripetal force and thus determine a rotational velocity threshold at which pitching of the blade tip sections begins. Second, the springs determine the relationship between propeller rotational speeds above the threshold, and the angle of pitch or degree of governing. Each of the blade tip sections traverses an arcuate path between a normal operating position (zero degrees) corresponding to propeller rotational speeds below the threshold, and a full governing position (e.g. 60 degrees) representing full governing. At the normal operating position, the blades transfer a maximum amount of wind induced torque to the propeller shaft. At the governing position, the blades transfer a reduced amount of wind induced torque and maintain propeller rotational velocity at or below a desired maximum rpm, even at extremely high (130 mph) wind speeds.

In connection with spring 132, preloading is accomplished by moving lock nut 148 to a position along rod 130 corresponding to a desired amount of spring compression. The relationship of increasing pitch angle versus increasing rotational velocity is governed by the spring constant k. In the present embodiment, it has been found suitable to preload spring 132 and its counterparts to predetermine a rotational velocity threshold of 280 rpm, corresponding to a wind speed of 26 mph. In addition, the spring constant k of the springs is selected to provide for a gradual increase in the pitch angle over a range of propeller rotational speeds from 280 rpm to about 320 rpm. The rotational velocity threshold can be increased by increasing the spring preload. A spring with a larger spring constant increases the propeller rotational speed at which the blade tip sections reach the full governing position.

The governing operation is further understood with reference to FIGS. 11–13 which schematically illustrate transverse profiles of medial section 34b and tip section 34c taken near their juncture. FIG. 11 represents propeller rotational speeds below the rotational velocity threshold, with tip section 34c in the normal operating position. The blade section profiles have the same size and shape near their juncture, and are aligned, with the result that the two profiles appear as one in this figure.

At speeds below the threshold, the force of spring 132, applied to tip section 34c through rod 130, cable 128 and shaft 106, is sufficient to maintain the tip section in the normal operating position. When the wind speed increases and rotates the propeller at a speed above the threshold, the centrifugal force effect, i.e. the tendency of the tip sections to travel tangentially rather than circumferentially, overcomes the centripetal force to move tip section 34c away from medial section 34b. This outward movement compresses spring 132 by an amount that depends on the spring constant, in any event increasing the centripetal force. Due to the guide/guide follower coupling, blade tip section 34c is caused to pivot as it moves away from the intermediate section. Assuming the wind direction remains constant, the blade pitching action orients blade tip section 34c in a manner to reduce its effectiveness in transferring wind power to the propeller shaft. As a result, the propeller rotational speed is reduced, compared to what it would have been in the absence of blade tip pitch. Assuming a constant wind speed, the blade pitching action tends to diminish or prevent the increase in rotational speed, thus reducing the centrifugal force effect. This reduction, combined with the increase in centripetal force due to spring compression, brings the centrifugal force effect and the centripetal force into an equilibrium. This locates distal tip section 34c at an intermediate governing position between the normal operating position and the full governing position shown in FIG. 12.

Further increases in wind speed lead to further increases in propeller rotational speed, in turn leading to higher equilibrium pitch angles, until the pitch angle reaches a maximum angle corresponding to full governing, shown in FIG. 13.

Profiles taken transversely through the blade medial and tip sections vary in size because of the blade taper, but are at least generally similar to the shapes indicated in FIGS. 11–13, reflecting the airfoil character of these propeller blade sections. In normal operation at speeds below the threshold, the relatively flat sides of the medial and tip sections face the wind, indicated by the solid arrows outside of the profile. The arrow inside of the profile indicates the "forward" or circumferential direction traversed by the rotating propeller blades. As the propeller rotates, the wind direction relative to each blade takes on a circumferential component, with a resultant direction relative to the blades indicated by the arrow drawn in broken lines. Accordingly, there is a component of airflow from the relatively blunt leading edge of each blade, to the more pointed trailing edge. The difference in distances between the relatively flat upwind side and the curved downwind side produces an aerodynamic lift.

As seen in FIGS. 12 and 13, the pitching of blade tip section 34c progressively moves the tip section toward a "stall" position in which the relatively flat side of the tip section is perpendicular, or nearly perpendicular, to the wind direction relative to the blades indicated by the broken-line arrow. This reduces the efficiency of the blade, with the reduction becoming more pronounced with an increasing pitch angle.

Figure 14:
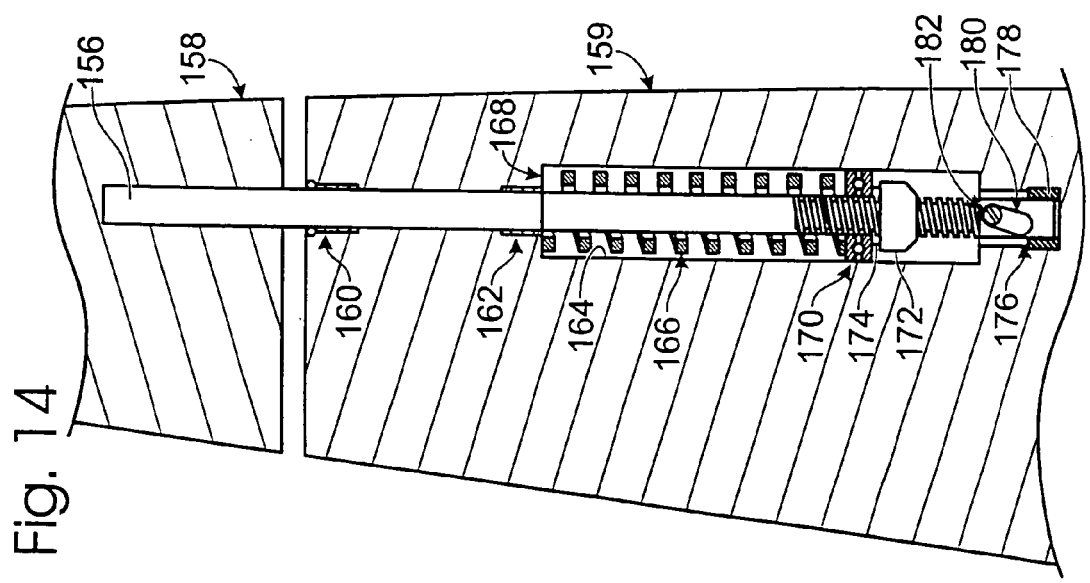
FIG. 14 is a partial elevation of the medial section and tip section of a propeller blade incorporating alternative embodiment components for governing and biasing the tip section.

FIG. 14 illustrates part of an alternative embodiment governing mechanism including a shaft 156 embedded within or otherwise fixed to a blade tip section 158 and supported rotatably within a blade medial section 159 through bushings 160 and 162. Shaft 156 further extends into an enlarged cavity 164, which also contains a coil spring 166 surrounding the shaft. Spring 166 is maintained in compression between a radially outward edge 168 of the cavity and a ball bearing 170. Spring compression is adjusted by selectively positioning a lock nut 172, which acts upon ball bearing 170 through a lock washer 174. Beyond cavity 164, shaft 156 extends into a narrower bore 176, supported for rotation through a bushing 178. A single helical slot 180, formed in shaft 156, follows a pin 182 integral with blade section 159, causing tip section 158 to pitch as it moves axially away from the medial section. The previously described arrangement with two slots 120 and 122 is generally preferred, because each slot can be smaller, to better preserve shaft structural integrity. Similar components are provided in the other blades of the propeller, not shown.

This arrangement is advantageous from a cost standpoint, using a single shaft in lieu of a shaft, cable and rod. Also, there is no need to form an opening through the complete length of the medial blade section. However, cavity 164 is a disadvantage. Due to its impact on the structural integrity of blade section 159, there may be a need to thicken the blade by adding reinforcing material in the region of the cavity. The arrangement shown in FIGS. 7–10 is more durable, primarily because the force of the compressed spring is borne along the steel blade mounting section, rather than along the medial blade section.

Figure 15:
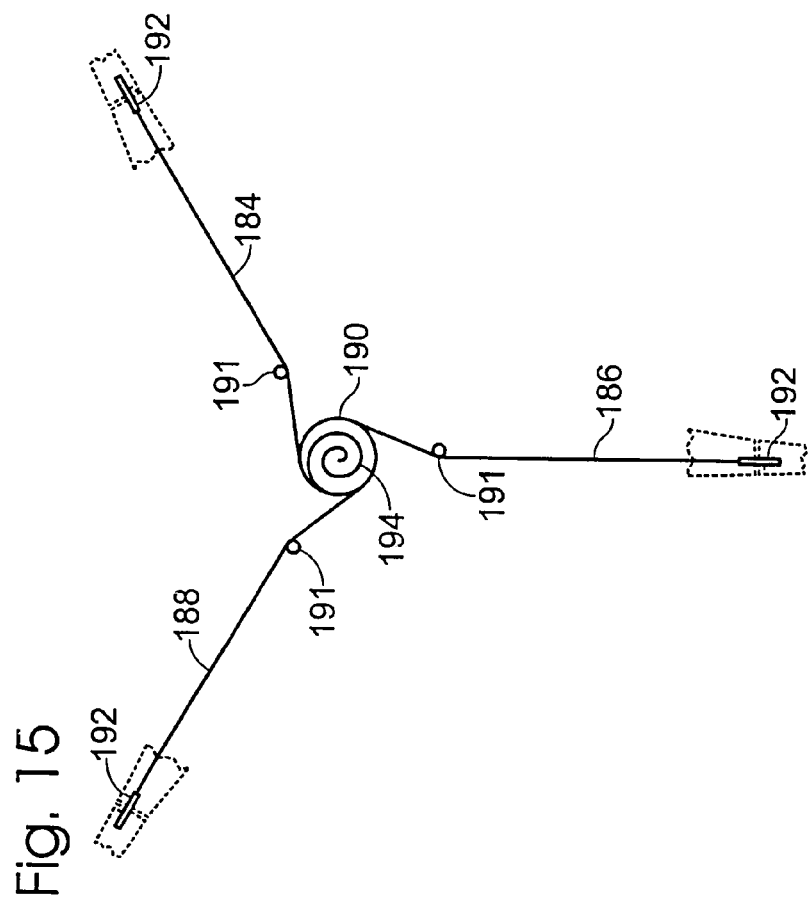
FIG. 15 is a schematic view illustrating an alternative governing and tip section biasing structure.

FIG. 15 schematically illustrates an alternative governing mechanism for a three-blade propeller, in which cables 184, 186 and 188 are secured to a hub 190 rotatable about the rotor axis. Each cable is trained about a pulley 191 or other suitable guide, then extends radially outward to a permanent coupling to a shaft 192 similar to shaft 106 (FIG. 8) in that shaft 192 is fixed to an associated blade tip section, and rotates within its associated blade medial section, guided by a cam/cam follower arrangement that causes the tip section to pitch as it moves away from its adjacent blade section. In this governing mechanism, three coil compression springs are replaced with a single torsion spring 194, preloaded to bias hub 190 in the counter clockwise direction as viewed in the figure. As before, the amount of preload and spring constant k can be selected to determine the rotational velocity threshold and the relationship of pitch angle to propeller rotational speeds above the threshold.

The primary advantage of this approach is that the single torsion spring balances the blades by providing the same centripetal force to each of cables 184–188. This eliminates the need to adjust several coil springs in order to balance the blade pitching action.

Figure 16:
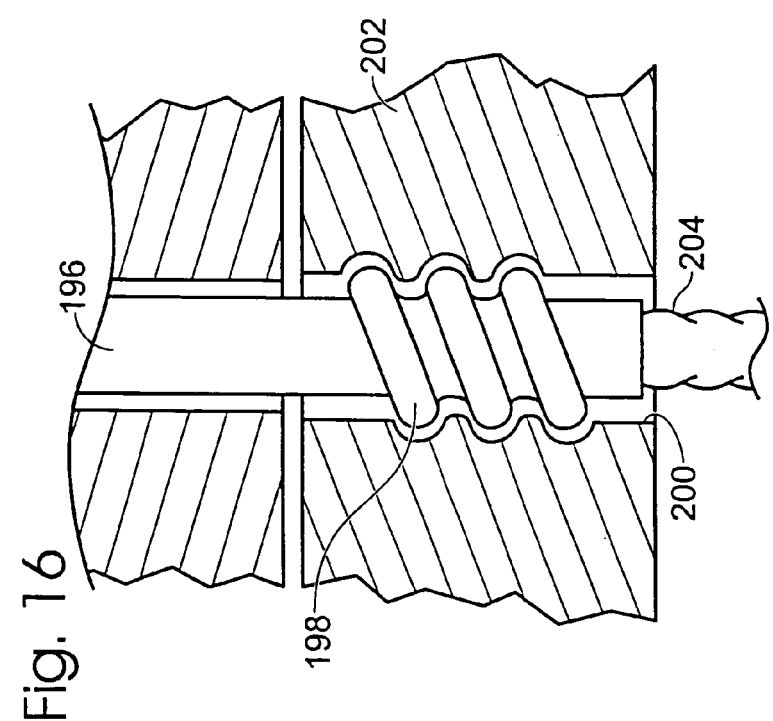
FIG. 16 shows an alternative embodiment coupling of a distal tip section and medial section of a propeller blade.

FIG. 16 illustrates part of a further alternative embodiment governing mechanism, specifically an alternative to the cam/cam follower arrangement that associates tip section pitching with tip section axial movement away from its adjacent blade section. In this arrangement, a shaft 196 is formed with external threads 198. An opening 200, formed radially along an intermediate blade section 202, includes internal threads adapted to engage the external threads of the shaft. The centripetal force is provided through a cable 204 coupled to the shaft.

Figure 17:
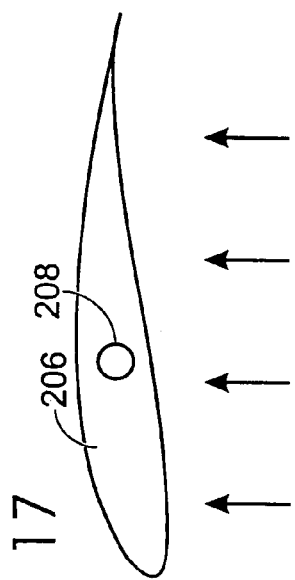
FIGS. 17–19 illustrate alternative embodiment propeller blades with different placements of a tip section pitch axis.

A salient advantage of the present invention resides in the options for locating the pitch axis relative to its associated blade tip section. FIG. 17 shows the profile of a blade tip section 206 with a pitching shaft 208 located for a balanced response, in which the wind pressure, at least initially when the propeller is stationary or rotating at a low velocity, is substantially the same on both sides of a pitch axis determined by shaft 208. Accordingly, blade section pitching is controlled primarily by the propeller rotational velocity. The pitching tendency is neither assisted nor counteracted by wind pressure.

Figure 18:
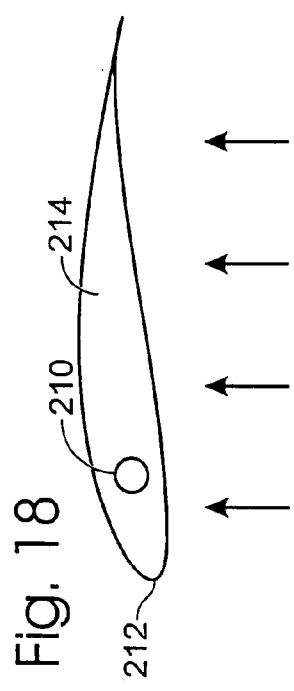

In FIG. 18, a shaft 210 is positioned closer to a leading edge 212 of a tip section 214. As a result, wind pressure is greater on the trailing edge side of the pivot axis, and tends to rotate the tip section counterclockwise as viewed in the figure, thus acting in concert with a spring or other source of centripetal force, to hold tip section 214 in the normal operating position.

Figure 19:
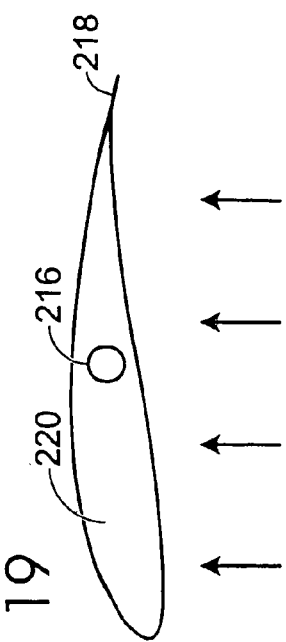

In FIG. 19, a shaft 216 is located closer to a trailing edge 218 of a tip section 220. With more wind pressure on the leading edge side of the pitch axis, the wind tends to rotate the tip section clockwise. Accordingly, rather than providing pressure to maintain tip section 220 in the normal operating position, the wind contributes to the pitching action. This wind-assisted arrangement tends to be less stable than the other arrangements, limiting the extent of the offset of shaft 216.

The approach shown in FIG. 18 is beneficial, particularly if the electrical load due to generator 28 is lost due to an accident, an electrical system malfunction, or interruption of a utility connection. Under a normal electrical load, in this arrangement, the centrifugal force effect overcomes wind pressure as well as the spring force to begin pitching at the chosen rotational velocity threshold, e.g. 280 rpm. If the electrical load is lost, the propeller rpm is higher at any given wind speed than it would be with the electrical load present. Conversely, the wind speed, and with it wind pressure, is less at any given propeller rpm. As a result, when the electrical load is lost, the wind pressure effect is diminished and the blade tip sections begin pitching at an rpm lower than the designed threshold.

Consequently, overspeed protection actually is increased when the normal electrical load is lost. Another benefit of the earlier governing action is the reduction of aerodynamic noise, resulting in quieter operation under no-load conditions. This feature also makes it possible to reduce the electrical output of the generator in a battery charging system when the battery is fully charged, without increasing propeller speeds to the point of causing excessive aerodynamic noise.

Figure 20:
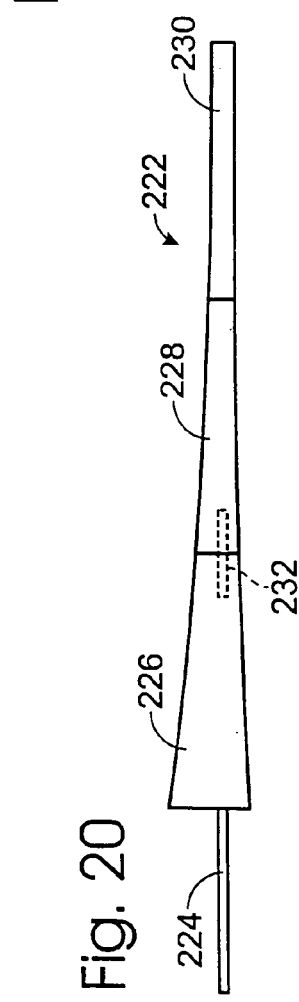
FIG. 20 is a side elevation of an alternative embodiment propeller blade.

FIG. 20 illustrates an alternative embodiment propeller blade 222, including a mounting section 224, an intermediate blade section 226, an intermediate blade section 228, and a blade tip section 230. Sections 226, 228 and 230 cooperate to provide a single, continuous airfoil in the normal operating position as shown. Mounting section 224 has a non-airfoil configuration, as in the previously discussed propeller blade embodiments.

Blade section 226 is fixed to mounting section 224. Blade section 228 in turn is fixed with respect to section 226, e.g. by a rectangular plate 232 embedded in blade sections 226 and 228. Blade tip section 230 is mounted to pivot relative to section 228, on a pitch axis that extends substantially parallel to the blade length. The pivotal coupling includes a guide/guide follower arrangement and a spring for biasing tip section 230 toward the normal operating position, not shown in FIG. 20 but similar to the components discussed in connection with other embodiments. Thus, only tip section 230 pitches to govern the propeller, while sections 224, 226 and 228 remain angularly fixed.

The primary advantage of blade 222 is the reduced length of the blade sections. For example, a ten-foot blade might include a two-foot mounting section, intermediate sections of 2.5 feet each, and a three-foot tip section. As noted previously, shorter blade sections are advantageous, particularly if they are fabricated by injection molding. As an alternative to this example, longer airfoil sections, e.g. four feet, can be used to fabricate longer propeller blades.

Devices configured according to the present invention can be employed in a variety of systems, including a coupling to a household or other electrical supply, a direct coupling to a single appliance such as a pump or water heater, or a coupling to a battery in a charging system. In accordance with the present invention, governing action is applied to the propeller blades, facilitating a more stable and secure mounting of the propeller shaft while substantially reducing structural loads, and affording the options of neutral governing, wind assisted governing, and wind resisted governing. To reduce noise and enhance wind tracking, the propeller blades are disposed downwind, inclined to define a cone diverging in the downwind direction, and shaped with airfoils disposed radially beyond the generator. An open generator design increases exposure to the wind, resulting in cooler and therefore more efficient generator operation.

What is claimed is:

1. A wind energy conversion apparatus, comprising:
   a rotor defining a rotor axis;
   at least two propeller blades, each said blade defining a respective blade axis extending at least partially radially from said rotor axis, said propeller blades for rotation about said rotor axis in response to wind flow, each said propeller blade including a first blade section fixedly attached to said rotor and a second blade section at least about 33% of the length of said first blade section, wherein said first blade sections and said second blade sections are formed by injection molding, wherein said second blade sections are mounted for pivoting about respective pivot axes between normal operating positions thereof and governing positions in which said second blade sections transfer reduced levels of wind power to said rotor; and a biasing structure for biasing said second blade sections toward said normal operating positions while urging said second blade sections toward said governing positions in response to centrifugal force produced by rotation of said propeller blades about said rotor axis, the apparatus further comprising an electrical generator stator assembly including an annular stator outer rim and an annular stator inner rim, a stator winding comprising an electrical conductor supported by said stator outer rim, and one or more stator frame members extending between said stator outer rim and said stator inner rim, wherein said one or more stator frame members are spaced apart from one another to provide first open regions allowing passage of the wind between said stator outer rim and said stator inner rim; and an electrical generator rotor assembly including an annular rotor outer rim and an annular rotor inner rim, a permanent magnet array supported by said rotor outer rim, and one or more rotor frame members extending between said rotor outer rim and said rotor inner rim, wherein said one or more rotor frame members are spaced apart from one another to provide second open regions allowing passage of the wind between said rotor outer rim and said rotor inner rim, said rotor outer rim and said stator outer rim being concentrically disposed with respect to each other such that said permanent magnet array is disposed in close radial proximity to said stator winding, said stator outer rim and said rotor outer rim being adapted for rotation relative to each other in response to rotation of said at least two propeller blades about said rotor axis.

2. The apparatus of claim 1, wherein said biasing structure is operable upon every said at least two propeller blades, whereby every said second blade section moves substantially the same amount toward its respective said governing position in response to a given level of rotational speed, said biasing structure comprising a coil spring.

3. The apparatus of claim 1, further comprising:
a support tower defining a yaw axis;
a propeller mounting structure disposed on said support tower, adapted to pivot about said yaw axis;
said rotor being mounted to said propeller mounting structure for rotation relative about said rotor axis; and
each of said at least two propeller blades being disposed at an angle greater than 90 degrees relative to said rotor axis extending from said support tower such that said at least two propeller blades are inclined in a direction away from said support tower, wherein said propeller mounting structure is adapted to pivot about said yaw axis in response to wind blowing from a direction such that said at least two propeller blades are disposed in a downwind direction from said support tower.

4. The apparatus of claim 3, wherein said biasing structure is operable upon every said at least two propeller blades, whereby every said second blade section moves substantially the same amount toward its respective said governing position in response to a given level of rotational speed, said biasing structure comprising a coil spring.

5. The apparatus of claim 3, wherein said electrical generator rotor assembly and said electrical generator stator assembly are disposed between said at least two propeller blades and said support tower.

6. A wind energy conversion apparatus, comprising:
an electrical generator stator assembly including an annular stator outer rim and an annular stator inner rim, a stator winding comprising an electrical conductor supported by said stator outer rim, and one or more stator frame members extending between said stator outer rim and said stator inner rim, wherein said one or more stator frame members are spaced apart from one another to provide first open regions allowing passage of the wind between said stator outer rim and said stator inner rim; and an electrical generator rotor assembly including an annular rotor outer rim and an annular rotor inner rim, a permanent magnet array supported by said rotor outer rim, and one or more rotor frame members extending between said rotor outer rim and said rotor inner rim, wherein said one or more rotor frame members are spaced apart from one another to provide second open regions allowing passage of the wind between said rotor outer rim and said rotor inner rim, said rotor outer rim and said stator outer rim being concentrically disposed with respect to each other such that said permanent magnet array is disposed in close radial proximity to said stator winding, said stator outer rim and said rotor outer rim being adapted for rotation relative to each other in response to rotation of at least one propeller blade about a rotor axis.

7. The apparatus of claim 6, further comprising:
a rotor adapted for rotation about said rotor axis;
at least two propeller blades, each said blade defining a respective blade axis extending at least partially radially from said rotor axis, said propeller blades for rotation about said rotor axis in response to wind flow, each said propeller blade including a first blade section fixedly attached to said rotor and a second blade section, wherein said second blade section is mounted for pivoting said second blade section relative to said first blade section between a normal operating position and a governing position in which said blade transfers a reduced level of wind power to said rotor; and a biasing structure for biasing said pivoting in a governing direction adapted to reduce the amount of wind power received by each said second blade section in response to centrifugal force produced by rotation of each said propeller blade about said rotor axis.

8. The apparatus of claim 7, wherein said biasing structure is further adapted for biasing said second blade sections toward said normal operating positions in response to wind pressure produced thereon.

9. The apparatus of claim 7, wherein said biasing structure is operable upon every said at least two propeller blades, whereby every said second blade section moves substantially the same amount toward its respective said governing position in response to a given level of rotational speed, said biasing structure comprising a coil spring.

10. The apparatus of claim 7, further comprising:

a support tower defining a yaw axis;

a propeller mounting structure disposed on said support tower, adapted to pivot about said yaw axis;

said rotor being mounted to said propeller mounting structure for rotation relative about said rotor axis; and each of said at least two propeller blades being disposed at an angle greater than 90 degrees relative to said rotor axis extending from said support tower such that said at least two propeller blades are inclined in a direction away from said support tower, wherein said propeller mounting structure is adapted to pivot about said yaw axis in response to wind blowing from a direction such that said at least two propeller blades are disposed in a downwind direction from said support tower.

11. The apparatus of claim 10, wherein said electrical generator rotor assembly and said electrical generator stator assembly are disposed between said at least two propeller blades and said support tower.

12. The apparatus of claim 7, wherein each of said at least two propeller blades respectively comprises an airfoil, each said airfoil for transforming said wind flow into wind power for driving said rotor, and a respective mounting component disposed between said rotor and the respective said airfoil and having a non-airfoil configuration.

13. The apparatus of claim 12 wherein said biasing structure is further adapted for biasing said second blade sections toward said normal operating positions in response to wind pressure produced thereon.

14. The apparatus of claim 13, wherein said biasing structure is operable upon every said at least two propeller blades, whereby every said second blade section moves substantially the same amount toward its respective said governing position in response to a given level of rotational speed, said biasing structure comprising a coil spring.

15. The apparatus of claim 7, wherein said biasing structure is operable upon every said at least two propeller blades, whereby every said second blade section moves substantially the same amount toward its respective said governing position in response to a given level of rotational speed, said biasing structure comprising a coil spring.

* * * * *